Sept. 6, 1927.  
J. KINDERVATER  
1,641,171  
METHOD AND APPARATUS FOR MAKING GASKETS  
Filed Oct. 28, 1925
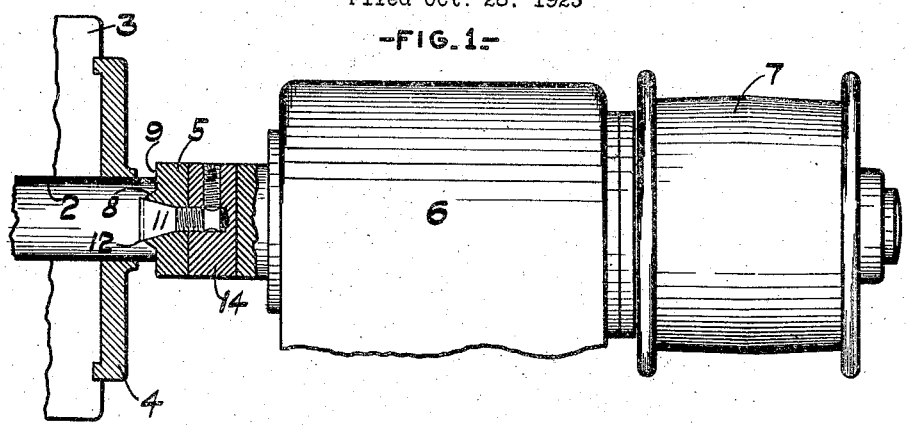
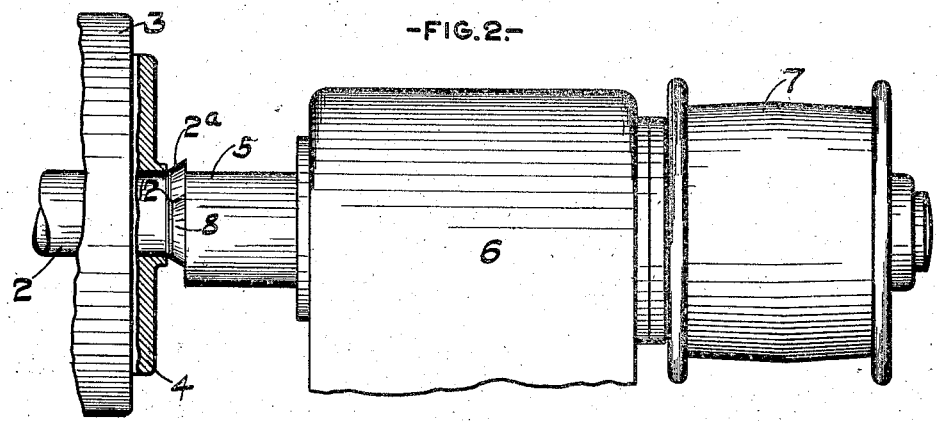
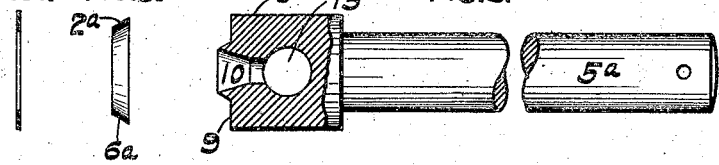
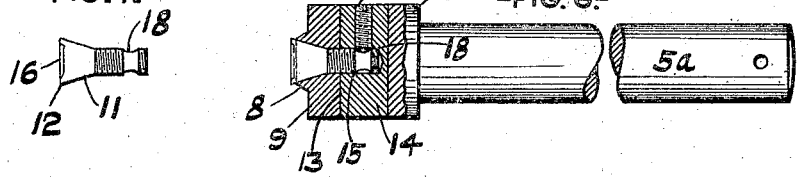
INVENTOR  
Julius Kindervater  
BY  
Clarence B Kerr  
ATTORNEY Patented Sept. 6, 1927.

1,641,171

UNITED STATES PATENT OFFICE.

JULIUS KINDERVATER, OF BROOKLYN, NEW YORK.

METHOD AND APPARATUS FOR MAKING GASKETS.

Application filed October 28, 1925. Serial No. 65,302.

Fig. 1 is an elevation, partly in section, of apparatus for carrying out my invention, in which the apparatus is in position to begin a gasket forming operation; Fig. 2 is an elevation similar to Fig. 1, also partly in section, showing the partially formed gasket about to be cut off from the blank; Fig. 3 is a section of the gasket blank after it has been cut off; Fig. 4 is a section of a completely formed gasket; Fig. 5 is a plan, partly in section, of the arbor with the shaft upon which it rotates; Fig. 6 is an elevation, partly in section, of the arbor with the cutter in position therein; and Fig. 7 is a side elevation of the cutter.

My invention relates to the manufacture of ring gaskets and comprises an improved process and apparatus by which gaskets are formed and cut off from tubular stock in one operation without any waste. In particular, my invention is adapted to the production of copper gaskets used between the cap and sleeve of flexible staybolts, employed to stay fire box sheets in steam boilers, but it is equally applicable to making flat ring gaskets used for various purposes.

In the practice of this invention, a piece of tubing of such ductility that it can be spun, is gripped in the revolving spindle of the machine and allowed to protrude a sufficient distance to form a gasket of the desired width. A revolving arbor having a conical projection in the axis of which is inserted a bevelled edge cutter is brought to bear against the inside surface of the tubing. The movement of the projection transverse to the axis of the spindle first causes the end of the tube to flare outwardly and then, as the cutter is brought into engagement with the tube, to be cut and separated from the remainder of the tube stock. The flared ring may then be flattened to form a regular flat ring gasket, thus completing the operation with no waste of material.

My invention also comprises the various features which I shall hereinafter describe and claim.

Referring to the drawings, the material to be formed, preferably in the shape of a tube 2, is mounted in a hollow revolving spindle 3 having a shear plate 4 on the face thereof about the axial opening therein. The cutter arbor 5, secured on a shaft 5ª, is mounted for rotation in the tool carriage 6, and may be rotated by the pulley 7 or other suitable means. The arbor 5 in addition to being rotatable is capable of being moved at right angles to the axis about which it rotates, such as along a cross slide (not shown) upon which the carriage 6 may be mounted. The arbor 5 has a conical projection 8 extending outwardly from its front face 9, and a seat 10 about its axis for the cutter 11, which flares outwardly to form a cutting edge 12. Extending through a hole 13 in the arbor 5 at right angles to its axis, is a plug 14, which has in its forward face a recess 15 registering with the inner end of the seat 10 for the inner end of the cutter 11. The recess 15 and the inner end of the seat 10 are threaded for reception of a threaded portion of the cutter 11, which may be screwed thereinto by the screw driver slot 16 in its outer end. Intersecting the inner end of the recess 15, the plug 14 has a threaded aperture for a locking screw 17, the inner end of which engages an annular groove 18 in the inner end of the cutter 11, and thereby locks the cutter 11 firmly in position in the arbor 5.

The distance the cutting edge 12 of the cutter 11 extends forwardly from the face 9 of the arbor 5 determines the width of the gaskets to be produced.

In the operation of the machine, the spindle 3 and cutter arbor 5 are revolved at approximately the same axial speed. The tubular blank 2 is fed forward by any suitable feeding mechanism (not shown) into contact with the face of the arbor 5, and the arbor, while rotating, is moved transversely so as to bring the cone-shaped face of the projection 8 into engagement with the inside face of the tube 2. This causes the end 2ª of the tube 2 extending beyond the plate 4 to be spun out in the shape of a frustum of a cone. Further, transverse movement of the arbor 5 brings the cutting edge 12 of the cutter 11 into contact with the inside of the portion 2ª and severs it against the outer face of the shear plate 4 from the remainder of the tube 2. The ring may then be flattened into the form shown in Fig. 4, or it may be applied in the bevelled shape shown in Fig. 3 and flattened during such application. After the arbor is retracted and returned to central position, the hollow tube is then advanced beyond the shear plate 4 a predetermined distance into engagement with the arbor, and the operation is then repeated.

Any suitable actuating mechanism may be employed, but as rapid production is desired, it is preferable to have the operations of advancing the tube and gripping it, the traverse of the cutter and its return to central position, performed automatically, so that they may be in proper sequence and be correctly timed with respect to each other.

The terms and expressions which I have employed are used as terms of description and not of limitation, and I have no intention, in the use of such terms and expressions, of excluding any equivalents of the features shown and described, or portions thereof, but recognize that various modifications are possible within the scope of the invention claimed.

What I claim is:

1. The process of making metallic gaskets, which comprises spinning a bevelled end on a tube; and then spearating the bevelled end from the remainder of the tube by a transverse cut; thereby forming a gasket of a shape like a frustum of a cone.

2. The process of making metallic gaskets, which comprises spinning a bevelled end on a tube with a spinning tool and cutting off the bevelled end by a transverse movement of the spinning tool, and then shaping the cut-off portion to gasket form.

3. In apparatus for forming metallic gaskets from tubular stock, the combination of a hollow rotatable spindle forming a holder for a tubular blank; a tool holder; a cutting tool mounted in the tool holder, the tool holder being rotatable and also capable of movement transverse to its axis of rotation, the tool holder being adapted to shape the end of the tube and the tool to sever the end from the remainder of the tube by a transverse movement.

4. In apparatus for forming metallic gaskets from tubular stock, the combination of a hollow rotatable spindle forming a holder for a tubular blank; a rotatable tool holder having an inclined annular shoulder thereon for spinning a bevelled end on said tubular blank; and a cutting tool mounted in the tool holder adapted to engage the bevelled end and sever it by a transverse cut.

5. In apparatus for forming metallic gaskets from tubular stock, the combination of a hollow rotatable spindle forming a holder for a tubular blank; a tube seating therein; a rotatable tool holder having an inclined annular shoulder thereon for spinning a bevelled end on said tubular blank; a plug ceated in a transverse aperture in the holder; and a cutting tool mounted in the tool holder and extending into the plug, the cutting tool being adapted to engage the bevelled end of the blank and sever it by a transverse cut.

6. In apparatus for forming metallic gaskets from tubular stock, the combination of a hollow rotatable spindle forming a holder for a tubular blank; a rotatable tool holder having an inclined annular shoulder thereon for spinning a bevelled end on said tubular blank; a transversely extending member seated in the tool holder, the member and tool holder having apertures extending along the axis of the tool holder; a cutting tool seating in said apertures; and means for securing the tool in said apertures.

JULIUS KINDERVATER.